DESIGN.

C. D. PLATT.

ELECTRIC SWITCH MEMBER.

APPLICATION FILED APR. 12, 1919.

Reissued July 15, 1919. 14,689.

WITNESSES:

INVENTOR

Clarence D. Platt

BY

ATTORNEYS.

UNITED STATES PATENT OFFICE.

CLARENCE D. PLATT, OF BRIDGEPORT, CONNECTICUT.

DESIGN FOR AN ELECTRIC-SWITCH MEMBER.

14,689. Specification for Reissued Design. Reissued July 15, 1919.

Original No. 51,868, dated March 12, 1918, Serial No. 138,509, filed December 22, 1916, for 3½ years. Application for reissue filed April 12, 1919. Serial No. 289,769. Term of patent 14 years.

*To all whom it may concern:*

Be it known that I, CLARENCE D. PLATT, a citizen of the United States, residing at Bridgeport, Fairfield county, Connecticut, have invented a new, original, and ornamental Design for an Electric-Switch Member, of which the following is a specification, reference being had to the accompanying drawing, forming part thereof, in which—

Figure 1:
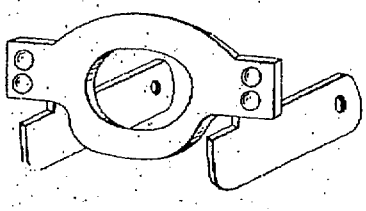
Figure 1 is a perspective view of the switch member embodying my new design.
Figure 2:
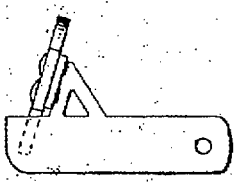
Fig. 2 is a side view of the same.

I claim:

The design for an electric switch member substantially as shown.

CLARENCE D. PLATT.